UNITED STATES PATENT OFFICE.

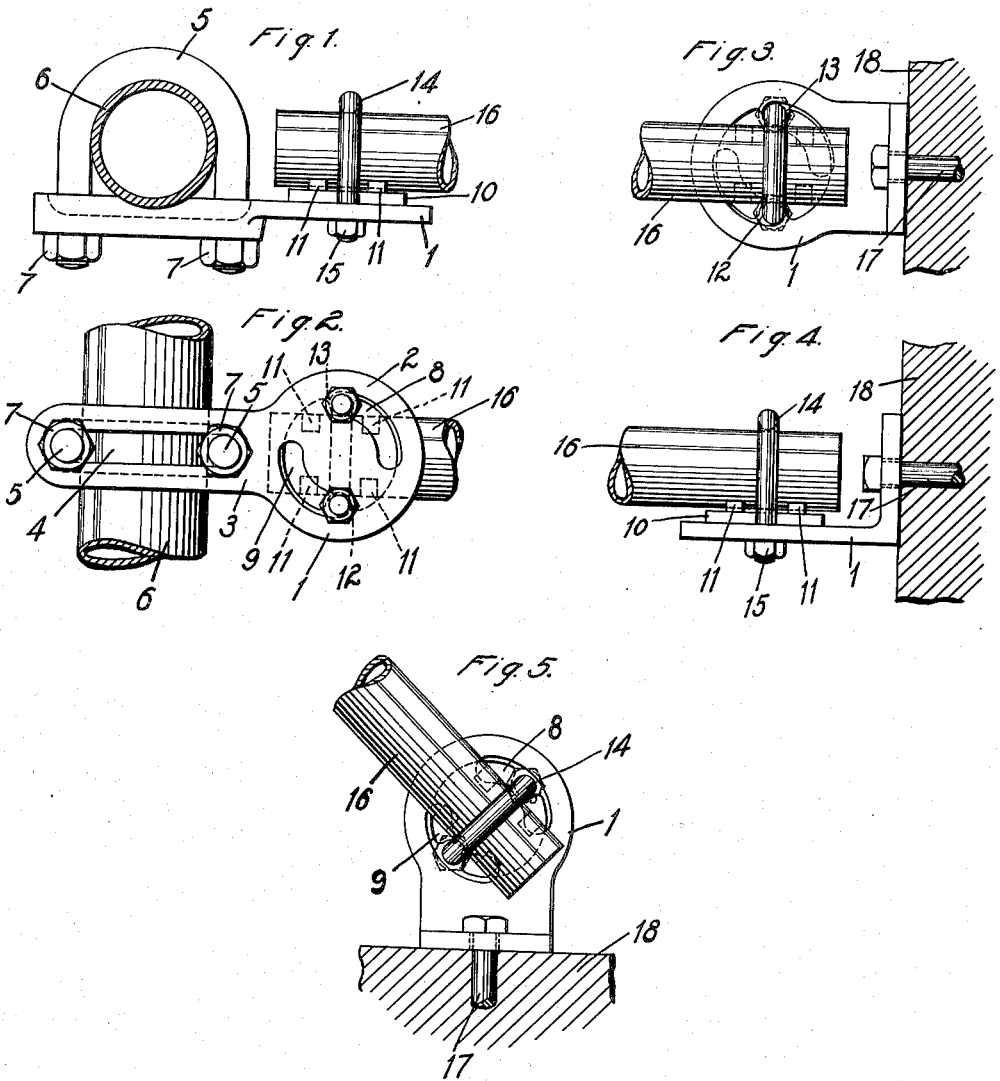

JAMES M. BROWN, OF PITTSBURGH, PENNSYLVANIA, ASSIGNOR TO WESTINGHOUSE ELECTRIC AND MANUFACTURING COMPANY, A CORPORATION OF PENNSYLVANIA.

TUBE-CLAMP.

1,303,249.   Specification of Letters Patent.   Patented May 13, 1919.

Application filed August 28, 1915. Serial No. 47,899.

*To all whom it may concern:*

Be it known that I, JAMES M. BROWN, a citizen of the United States, and a resident of Pittsburgh, in the county of Allegheny and State of Pennsylvania, have invented a new and useful Improvement in Tube-Clamps, of which the following is a specification.

My invention relates to tube clamps, and it has particular reference to clamps adapted for use on switchboards that are constructed mainly of tubing.

The object of my invention is to provide a clamp that may be utilized for the purpose of clamping tubes in a plurality of positions.

Figure 1 of the accompanying drawings is a side elevational view of a clamp embodying my invention; Fig. 2 is a bottom plan view of the clamp shown in Fig. 1; Fig. 3 is a top plan view of a modified form of clamp embodying my invention; Fig. 4 is a side elevational view of the clamp shown in Fig. 3 and Fig. 5 is a top plan view of the clamp shown in Figs. 3 and 4 illustrating one of the positions in which a tube may be clamped.

In Figs. 1 and 2 of the drawings a bracket member 1 comprises an annular body portion 2 and a substantially straight elongated portion 3. The elongated portion 3 is provided with an opening 4 through which project the respective ends of a U-shaped member 5 that is adapted to pass around a tube 6. The ends of the U-shaped member 5 are threaded to receive nuts 7 for the purpose of clamping the member 1 to the tube 6. The annular portion 2 of the member 1 is provided with two diametrically disposed curved elongated openings 8 and 9. A disk 10 is provided with projections 11 on one face thereof and indentations 12 and 13 along its periphery that are adapted to register with the openings 8 and 9, respectively. A U-shaped member 14 is threaded at its ends for the reception of nuts 15. The respective ends of the U-shaped member 14 are disposed in the openings 8 and 9 and in the indentations 12 and 13 for the purpose of clamping a tube 16 securely in engagement with the disk 10. The projections 11 are adapted to so position the tube 16 that when the disk 10 and the tube 16 are turned to any desired position and the nuts 15 tightened the tube 16 will be securely clamped in that position.

In Figs. 3, 4 and 5 of the drawings the member 1 is in the form of a bracket that may be secured by a bolt 17 to a stationary supporting member 18. In other respects the clamp shown in Figs. 3, 4 and 5 is the same as the clamp shown in Figs. 1 and 2 of the drawings.

It will be understood that the openings 8 and 9 may be of any length in order that the disk 10 may be turned through any angle, the disk 10 may be provided with openings instead of the indentations 12 and 13, and any form of a bracket may be provided without departing from the spirit and scope of my invention as set forth in the appended claims.

I claim as my invention:

1. A clamp comprising a bracket having oppositely disposed openings therein, a plate member having projections on one face thereof and oppositely disposed indentations along the periphery to register with the openings in the bracket, and a substantially U-shaped member adapted to be inserted in the indentations and in the openings.

2. A tube clamping device comprising a main body portion having oppositely disposed openings therein, a plate member having projections on one face thereof for positioning the tube and having oppositely disposed indentations along the periphery for registering with the openings in the main body, and means disposed in the openings for clamping the tube in position.

3. A tube clamping device comprising a main body portion having oppositely disposed openings therein, a disk having projections on one face thereof for positioning the tube, and means disposed in the openings for clamping the tube in any desired position.

4. A tube clamping device comprising a main body portion having oppositely disposed openings therein, a disk having projections on one face thereof for positioning the tube and oppositely disposed peripheral indentations, and binding means disposed in the openings and registering with the indentations for clamping the tube in position.

5. A tube clamping device comprising a main body portion having two oppositely disposed elongated openings therein, a disk having two oppositely disposed openings therein that are adapted to register with the openings in the main body portion, and means for clamping the disk in any position relative to the main body portion.

6. A tube clamping device comprising a main body portion having two oppositely disposed elongated openings therein, a disk having two oppositely disposed openings therein that are adapted to register with any portion of the openings in the main body portion, and a substantially U-shaped member adapted to be inserted in the openings for the purpose of clamping the disk in any position with respect to the main body portion.

7. A tube clamping device comprising a main body portion having two openings therein, a disk having projections on one face thereof for positioning the tube and openings adapted to register with the openings in the main body portion, and a yoke member adapted to be inserted in the openings for the purpose of clamping the tube in position.

8. A tube clamping device comprising a main body portion having oppositely disposed curved openings therein, a disk having tube-positioning means thereon and means disposed in the openings for clamping the tube to the disk and in any desired position with respect to the main body portion.

In testimony whereof, I have hereunto subscribed my name this 20th day of Aug., 1915.

JAMES M. BROWN.